(12) United States Patent
Harkey et al.

(10) Patent No.: US 11,745,771 B2
(45) Date of Patent: *Sep. 5, 2023

(54) RAPID DISCHARGE DOOR LOCKING SYSTEM

(71) Applicant: Trinity Rail Group, LLC, Dallas, TX (US)

(72) Inventors: Christopher C. Harkey, Dallas, TX (US); Aubra D. McKisic, Flower Mound, TX (US); Kenneth W. Huck, Fairview, TX (US)

(73) Assignee: TRINITY RAIL GROUP, LLC, Dallas, TX (US)

(*) Notice: Subject to any disclaimer, the term of this patent is extended or adjusted under 35 U.S.C. 154(b) by 436 days.

This patent is subject to a terminal disclaimer.

(21) Appl. No.: 17/011,545

(22) Filed: Sep. 3, 2020

(65) Prior Publication Data

US 2020/0398872 A1    Dec. 24, 2020

Related U.S. Application Data

(63) Continuation-in-part of application No. 15/650,091, filed on Jul. 14, 2017, now Pat. No. 10,773,735.

(51) Int. Cl.
| | | |
|---|---|---|
| *B61D 7/28* | (2006.01) | |
| *B61D 19/00* | (2006.01) | |
| *B61D 7/02* | (2006.01) | |
| *E05D 15/10* | (2006.01) | |

(52) U.S. Cl.
CPC .............. *B61D 7/28* (2013.01); *B61D 7/02* (2013.01); *B61D 19/005* (2013.01); *E05D 15/1007* (2013.01); *E05Y 2900/51* (2013.01)

(58) Field of Classification Search
CPC .......... B61D 7/28; B61D 7/02; B61D 19/005; E05D 15/1007; E05Y 2900/51
See application file for complete search history.

(56) References Cited

U.S. PATENT DOCUMENTS

| | | |
|---|---|---|
| 3,316,857 A | 5/1967 | Floehr |
| 6,019,049 A | 2/2000 | Gaydos et al. |
| 7,331,295 B1 * | 2/2008 | Marchiori ............... B61D 7/28 |
| | | 105/286 |
| 7,891,304 B2 | 2/2011 | Herzog et al. |
| 8,701,565 B2 | 4/2014 | Creighton et al. |
| 2005/0056185 A1 | 3/2005 | Herzog et al. |

(Continued)

OTHER PUBLICATIONS

International Preliminary Report on Patentability for PCT Patent Application PCT/US2020/051178, dated Mar. 31, 2022; 6 pages.

*Primary Examiner* — Scott A Browne
(74) *Attorney, Agent, or Firm* — BAKER BOTTS L.L.P.

(57) ABSTRACT

According to some embodiments, a discharge door locking system for a railcar discharge door comprises a lock piston configured to move between a first position (not engaged with an operating beam coupled to a discharge door) and a second position (engaged). The locking system comprises a first and second input. Activation of the first input moves the lock piston to the first position, and activation of the second input moves the lock piston to the second position. The first input of the locking system is coupled to a first input of an operating cylinder coupled to the operating beam. The first input of the operating cylinder is configured to move the discharge door to the open position.

18 Claims, 12 Drawing Sheets

(56) References Cited

U.S. PATENT DOCUMENTS

| | | |
|---|---|---|
| 2010/0275811 A1 | 11/2010 | Creighton et al. |
| 2012/0118195 A1 | 5/2012 | Creighton et al. |
| 2014/0216299 A1 | 8/2014 | Yue et al. |
| 2018/0180129 A1 | 6/2018 | Huck |

* cited by examiner

RAPID DISCHARGE DOOR LOCKING SYSTEM

RELATED APPLICATION

This application is a continuation in part of U.S. application Ser. No. 15/650,091, entitled "RAPID DISCHARGE DOOR LOCKING SYSTEM," filed Jul. 14, 2017.

TECHNICAL FIELD

Particular embodiments relate generally to railcars, and more particularly to a door locking system for rapid discharge railcars, such as hopper cars for carrying bulk materials.

BACKGROUND

Railway hopper cars transport and sometimes store bulk materials. Hopper cars generally include one or more hoppers which may hold cargo or lading during shipment. Hopper cars are frequently used to transport coal, sand, metal ores, aggregates, grain and any other type of lading which may be satisfactorily discharged through openings formed in one or more hoppers. Discharge openings are typically provided at or near the bottom of each hopper to rapidly discharge cargo. A variety of door assemblies or gate assemblies along with various operating mechanisms have been used to open and close discharge openings associated with railway hopper cars.

Transversely oriented discharge openings and gates are frequently coupled with a common linkage operated by an air cylinder. The air cylinder is typically mounted in the same orientation as the operating gate linkage which is often a longitudinal direction relative to the associated hopper.

Longitudinally oriented discharge openings and associated doors may provide a quicker discharge than transverse gates. Longitudinally oriented discharge openings and doors are often used in pairs that may be rotated or pivoted relative to the center sill or side sills of a hopper car. Longitudinally oriented discharge openings and doors may be coupled via linkages with a beam operated by an air cylinder. The air cylinder is typically mounted in the same orientation as the operating beam which is often a longitudinal direction relative to the associated hopper. The operating beam may be coupled to the discharge doors by door struts (linkages) that push (or pull) the gates open or pull (or push) them closed as the air cylinder moves the operating beam back and forth.

A hopper car is an example of a rapid discharge railcar. In general, rapid discharge railcars may use air cylinders, operating beams, and linkages to operate the bottom outlet doors.

SUMMARY

According to some embodiments, a railcar comprises an underframe, a hopper coupled to the underframe, a discharge door coupled to the hopper proximate the underframe, and an operating beam coupled to the discharge door and the underframe. The operating beam comprises a lock piston receiving recess. The railcar further comprises an operating cylinder coupled to the operating beam. The operating cylinder comprises a first input and a second input. The operating cylinder is configured to move the operating beam between a first position where the discharge door is in a closed position and a second position where the discharge door is in an open position, wherein activation of the first input causes the operating cylinder to move the operating beam to the first position and activation of the second input causes the operating cylinder to move the operating beam to the second position.

The railcar further comprises a discharge door locking system coupled to the underframe. The discharge door locking system comprises a lock piston, a first input, and a second input. The discharge door locking system is configured to move the lock piston between a first position where the lock piston is not engaged with the lock piston receiving recess and a second position where the lock piston is engaged with the lock piston receiving recess. Activation of the first input moves the lock piston to the first position, and activation of the second input moves the lock piston to the second position.

The second input of the operating cylinder is coupled to the first input of the discharge door locking system, and the first input of the operating cylinder is coupled to the second input of the discharge door locking system. When the second input of the operating cylinder is activated to move the discharge door to the open position, the first input of the discharge door locking system is also activated to disengage the lock piston from the lock piston receiving recess. When the first input of the operating cylinder is activated to move the discharge door to the closed position, the second input of the discharge door locking system is also activated to engage the lock piston with the lock piston receiving recess.

In particular embodiments, the first input and the second input of the operating cylinder and the first input and the second input of the discharge door locking system comprise pneumatic inputs. In other embodiments, the first and second inputs may comprise electrical, mechanical, or hydraulic inputs.

In particular embodiments, the second input of the operating cylinder is coupled to the first input of the discharge door locking system via a check valve, and the first input of the operating cylinder is coupled to the second input of the discharge door locking system via a check valve. In particular embodiments, the second input of the operating cylinder is coupled to the first input of the discharge door locking system via a 3-way valve and the first input of the operating cylinder is coupled to the second input of the discharge door locking system via a 3-way valve. In particular embodiments, the second input of the discharge door locking system comprises a spring.

In particular embodiments, the discharge door locking system further comprises an operating cylinder actuating valve coupled to the lock piston, the first input of the operating cylinder, and the second input of the operating cylinder. When the lock piston is in the first position, the operating cylinder actuating valve is configured to activate the second input of the operating cylinder to move the discharge door to the open position. When the lock piston is in the second position, the operating cylinder actuating valve is configured to activate the first input of the operating cylinder to move the discharge door to the closed position.

In particular embodiments, the discharge door comprises one of a transverse discharge door and a longitudinal discharge door. The railcar may comprise a hopper car.

According to some embodiments, a discharge door locking system for a railcar discharge door comprises a lock piston configured to move between a first position where the lock piston is not engaged with a lock piston receiving recess of an operating beam coupled to a discharge door and a second position where the lock piston is engaged with the lock piston receiving recess. The discharge door locking system further comprises a first input and a second input. Activation of the first input moves the lock piston to the first position; and activation of the second input moves the lock piston to the second position.

The first input of the discharge door locking system is coupled to a first input of an operating cylinder coupled to the operating beam. The first input of the operating cylinder is configured to, when activated, move the discharge door to the open position. The second input of the discharge door locking system is coupled to a second input of the operating cylinder. The second input is configured to, when activated, move the discharge door to the closed position.

In particular embodiments, the first input and the second input of the of the discharge door locking system comprise pneumatic inputs. The second input of the discharge door locking system may comprise a spring.

In particular embodiments, the first input of the discharge door locking system is coupled to the first input of the operating cylinder via a check valve, and the second input of the discharge door locking system is coupled to the second input of the operating cylinder via a check valve. In particular embodiments, the first input of the discharge door locking system is coupled to the first input of the operating cylinder via a 3-way valve, and the second input of the discharge door locking system is coupled to the second input of the operating cylinder via a 3-way valve.

In particular embodiments, the discharge door locking system further comprises an operating cylinder actuating valve coupled to the lock piston, the first input of the operating cylinder, and the second input of the operating cylinder.

According to some embodiments, a method of outfitting a railcar with a discharge door locking system comprises providing a railcar. The railcar comprising an underframe, a hopper coupled to the underframe, a discharge door coupled to the hopper proximate the underframe, and an operating beam coupled to the discharge door and the underframe. The operating beam comprises a lock piston receiving recess. The railcar further comprises an operating cylinder coupled to the operating beam. The operating cylinder comprises a first input and a second input. The operating cylinder is configured to move the operating beam between a first position where the discharge door is in a closed position and a second position where the discharge door is in an open position. Activation of the first input causes the operating cylinder to move the operating beam to the first position, and activation of the second input causes the operating cylinder to move the operating beam to the second position.

The method further comprises coupling a discharge door locking system to the underframe of the railcar. The discharge door locking system comprises a lock piston, a first input, and a second input. The discharge door locking system is configured to move the lock piston between a first position where the lock piston is not engaged with the lock piston receiving recess and a second position where the lock piston is engaged with the lock piston receiving recess. Activation of the first input moves the lock piston to the first position, and activation of the second input moves the lock piston to the second position.

The method further comprises coupling the second input of the operating cylinder to the first input of the discharge door locking system, and coupling the first input of the operating cylinder to the second input of the discharge door locking system. When the second input of the operating cylinder is activated to move the discharge door to the open position, the first input of the discharge door locking system is also activated to disengage the lock piston from the lock piston receiving recess. When the first input of the operating cylinder is activated to move the discharge door to the closed position, the second input of the discharge door locking system is also activated to engage the lock piston with the lock piston receiving recess.

In particular embodiments, the discharge door locking system further comprises an operating cylinder actuating valve coupled to the lock piston, the first input of the operating cylinder, and the second input of the operating cylinder. The method further comprises coupling the first and second inputs of the operating cylinder to the operating cylinder actuating valve. When the lock piston is in the first position, the operating cylinder actuating valve is configured to activate the second input of the operating cylinder to move the discharge door to the open position. When the lock piston is in the second position, the operating cylinder actuating valve is configured to activate the first input of the operating cylinder to move the discharge door to the closed position.

According to some embodiments, a railcar comprises an underframe, a hopper coupled to the underframe, a discharge door coupled to the hopper proximate the underframe, an operating beam coupled to the discharge door and the underframe, an operating cylinder coupled to the operating beam via a mechanical operating beam lock configured to move between a first, locked position and a second, unlocked position, and a discharge door locking system coupled to the underframe. The discharge door locking system comprising a lock block slidably coupled to the underframe. The lock block is configured to move between a first position where the lock block prevents the mechanical operating beam lock from moving to the unlocked position and a second position where the lock block does not prevent the mechanical operating beam lock from moving to the unlocked position.

In particular embodiments, the discharge door locking system further comprises an air inlet valve. The air inlet valve is configured so that the lock block moves to the first position when compressed air is supplied to the railcar and the lock block moves to the second position when compressed air is removed from the railcar.

As a result, particular embodiments of the present disclosure may provide numerous technical advantages. For example, particular embodiments may provide improved door securement with less adjustment. Particular embodiments may include a pneumatically operated discharge door locking system that is automatically synchronized with the discharge door actuating system. For example, synchronizing the discharge door locking system with the operation of the operating cylinder improves the efficiency of the unloading process. Railcars may be unloaded faster, because an operator performs fewer operations. Particular embodiments of the present disclosure may provide some, none, all, or additional technical advantages.

BRIEF DESCRIPTION OF THE DRAWINGS

For a more complete understanding of the particular embodiments, and the advantages thereof, reference is now made to the following written description taken in conjunction with the accompanying drawings, in which.

DETAILED DESCRIPTION

Rapid discharge railcars, such as hopper cars, may use air cylinders, operating beams, and linkages to operate bottom outlet doors. When the bottom outlet doors are closed, two features typically secure the doors. First, the linkages are in the over-center position. In the over-center position, the force from the weight of the lading on the doors pushes the operating beam and air cylinder toward the closed position. The second securement is a locking feature that prevents the beam, and therefore the air cylinder, from moving toward the open position. To open the doors, the locking feature needs to be released. Current locking features use a spring-loaded latch that must be mechanically pushed open as the air cylinder's piston extends to open the doors. Existing mechanical locks are dependent on timing and proper adjustment to operate efficiently.

Particular embodiments may provide improved door securement with less adjustment. Particular embodiments may include a pneumatically operated discharge door locking system that is automatically synchronized with the discharge door actuating system.

Particular embodiments are described with reference to FIGS. 1-12 of the drawings. Like numbers may be used for like and corresponding parts of the various drawings. Various features of the embodiments will be described with respect to hopper car 20 shown in FIGS. 1-4.

Figure 1:
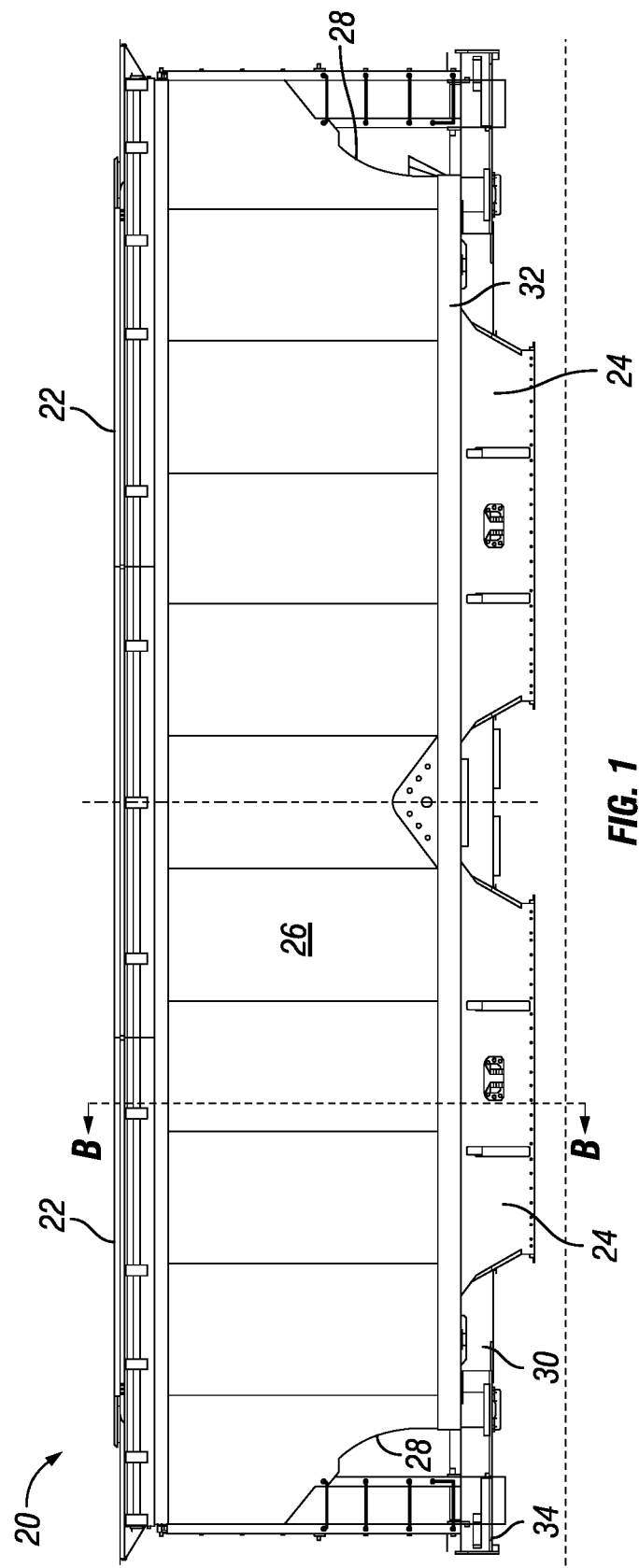
FIG. 1 is a schematic drawing in elevation showing a side view of an example hopper car, according to a particular embodiment.

FIG. 1 is a schematic drawing in elevation showing a side view of an example hopper car, according to a particular embodiment. Hopper car 20 may carry bulk materials such as coal and other types of lading. Examples of such lading may include sand, metal ores, aggregate, grain, ballast, etc.

Hopper car 20 may be generally described as a covered hopper car. However, other embodiments may include open hopper cars or any other cars suitable for carrying bulk lading. Hopper car 20 includes hoppers 22 with bottom discharge assemblies 24. Discharge assemblies 24 may be opened and closed to control discharge of lading from hoppers 22. As illustrated, hopper car 20 includes two hoppers 22. In other embodiments, hopper car 20 may include one, two, three, or any suitable number of hoppers 22.

In particular embodiments, hopper 22 is configured to carry bulk materials and the interior walls of hopper 22 are generally sloped towards discharge assembly 24 to facilitate discharge of the lading. Multiple hoppers 22 may be separated by interior bulkheads.

In particular embodiments, hopper car 20 may include a pair of sidewall assemblies 26 and sloped end wall assemblies 28 mounted on a railway car underframe. The railway car underframe includes center sill 34 and a pair of shear plates 32. A pair of sill plates 32 provide support for sidewall assemblies 26.

Center sill 34 is a structural element for carrying the loads of the hopper car. Center sill 34 transfers the various longitudinal forces encountered during train operation from car to car. Shear plates 30 extend generally parallel with center sill 34 and are spaced laterally from opposite sides of center sill 34.

Hopper car 20 is an example of a rapid discharge railcar. Particular embodiments may include hopper cars, or any other type of rapid discharge railcar comprising discharge doors.

Figure 2:
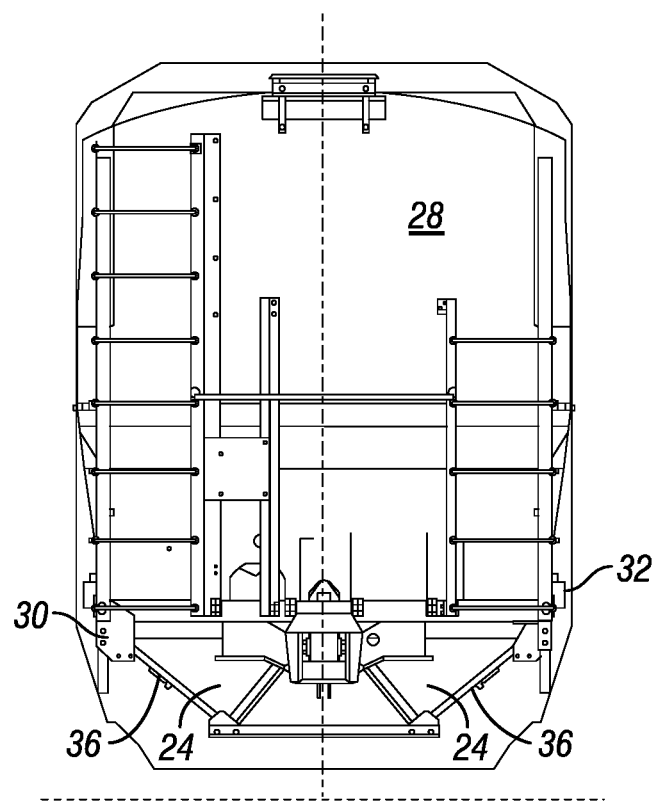
FIG. 2 is a schematic drawing in elevation showing an end view of an example hopper car, according to a particular embodiment.

FIG. 2 is a schematic drawing in elevation showing an end view of an example hopper car, according to a particular embodiment. FIG. 2 illustrates discharge assemblies 24, end wall assemblies 28, shear plates 30, and sill plates 32 of hopper car 20 illustrated in FIG. 1.

Discharge assembly 24 comprises slope sheet 36. Slope sheet 36 slopes from sidewall assembly 26 towards the center of hopper car 20 to facilitate discharge of the lading from the discharge opening of discharge assembly 24.

Figure 3:
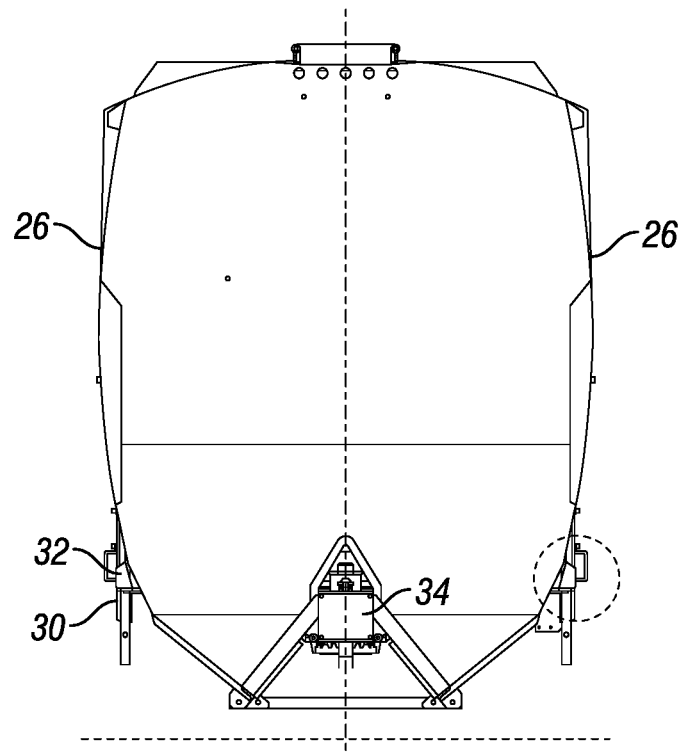
FIG. 3 is a schematic drawing showing a cross section view of an example hopper car taken along lines B-B of FIG. 1.

FIG. 3 is a schematic drawing showing a cross section view of an example hopper car taken along lines B-B of FIG. 1. FIG. 3 illustrates side wall assemblies 26, shear plates 30, sill plates 32, and center sill 34 of hopper car 20 illustrated in FIG. 1.

Figure 4:
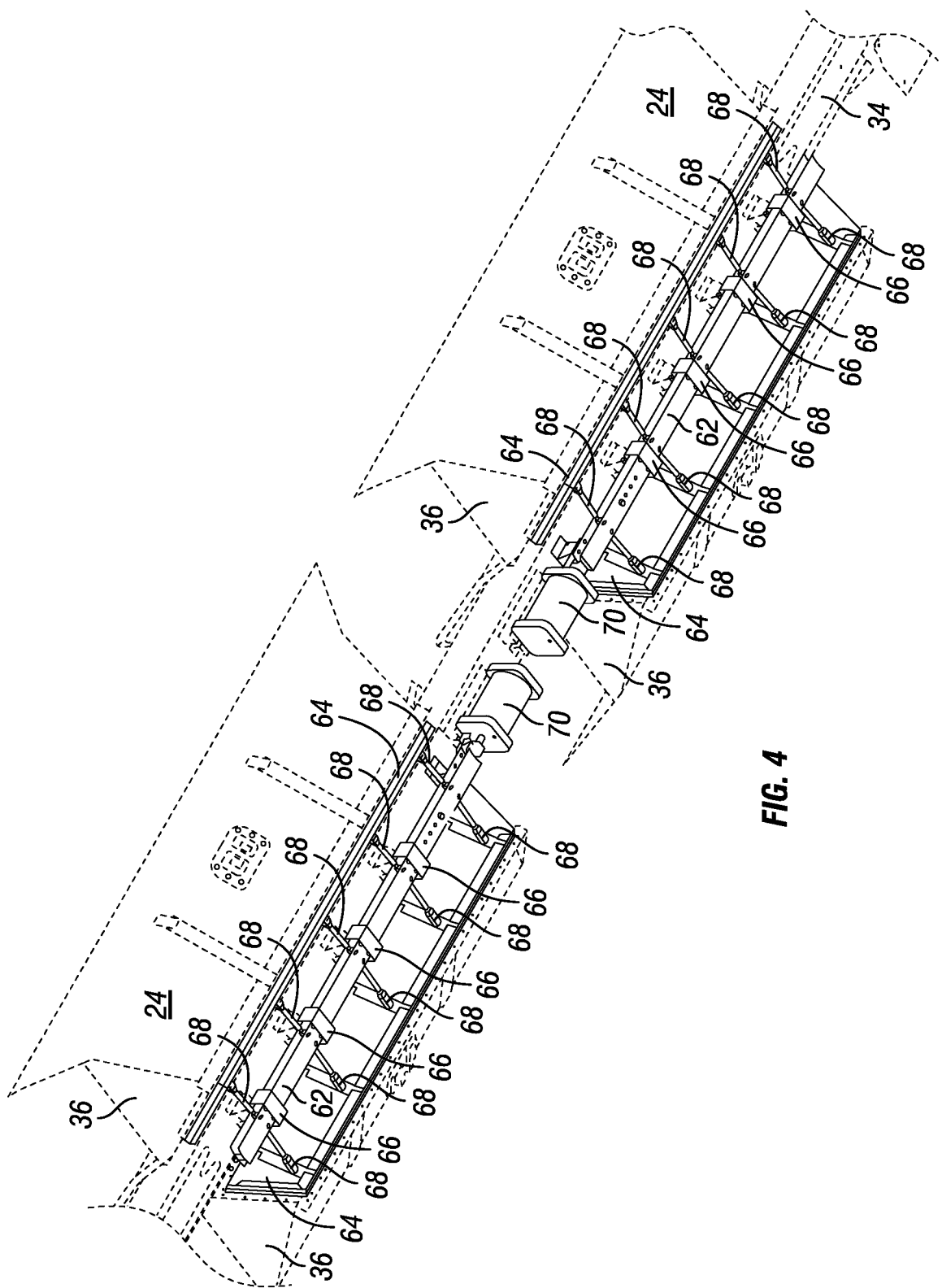
FIG. 4 is a block diagram illustrating longitudinal discharge doors underneath an example hopper car, according to a particular embodiment.

FIG. 4 is a schematic perspective drawing illustrating longitudinal discharge doors underneath an example hopper car, according to a particular embodiment. FIG. 4 illustrates in more detail the two discharge assemblies 24 illustrated in FIG. 1. Discharge assembly 24 includes operating beam 62, discharge doors 64, guides 66, door struts 68, and operating cylinder 70.

Operating beam 62 is coupled to center sill 34 by guides 66. Operating beam 62 is coupled to discharge door 64 by door struts 68. Operating cylinder 70 is coupled to operating beam 62 and is operable to move operating beam 62 back and forth through guides 66.

Operating beam 62 may comprise a steel box beam, may be extruded from aluminum or steel, may be pultruded as a fiber reinforced composite, such as a fiber or carbon composite, or any other suitable material.

Portions of slope sheet 36 cooperate with adjacent portions of center sill 34 to define longitudinal discharge openings. Longitudinal discharge openings are disposed along opposite sides of center sill 34.

Discharge doors 64 are hinged proximate to center sill 34. Various types of mechanical hinges may engage discharge doors 64 with center sill 34.

Discharge doors 64 are illustrated in the closed position, which prevents the discharge of lading through the longitudinal discharge openings. In operation, operating cylinder 70 moves operating beam 62 through guides 66 to open discharge doors 64 via door struts 68.

At a first end, door struts 68 are rotationally coupled to operating beam 62. At a second end, door struts 68 are rotationally coupled to discharge door 64. In particular embodiments, rotational coupling may be achieved via ball joints.

Operating cylinder 70 is operable to move operating beam 62 back and forth through guides 66. In particular embodiments operating cylinder 70 may comprise a pneumatic cylinder, or any type of motor suitable for moving operating beam 62 in a longitudinal direction.

Longitudinal movement of operating beam 62 results in radial extension of door struts 68 to move discharge doors 64 from their open position to their closed position. Movement of operating beam 62 in the opposite direction results in pulling, pushing, or moving discharge doors from their closed position to their open position which allows rapid discharge of any lading contained within railway hopper car 20.

In particular embodiments, each hopper 24 of hopper car 20 may be operated independently of each other. In other embodiments, each hopper 24 may be operated in unison by a single operating cylinder 70 and operating beam 62.

Figure 5A:
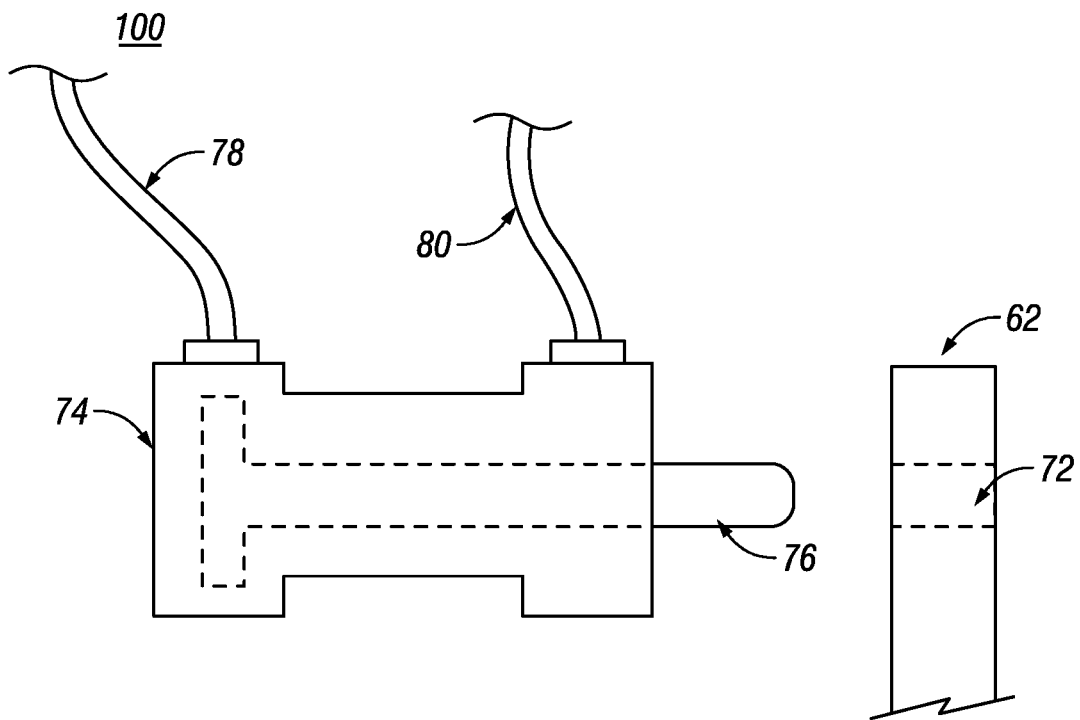
FIG. 5A is a block diagram illustrating a discharge door locking system in the unlocked position, according to a particular embodiment.
Figure 5B:
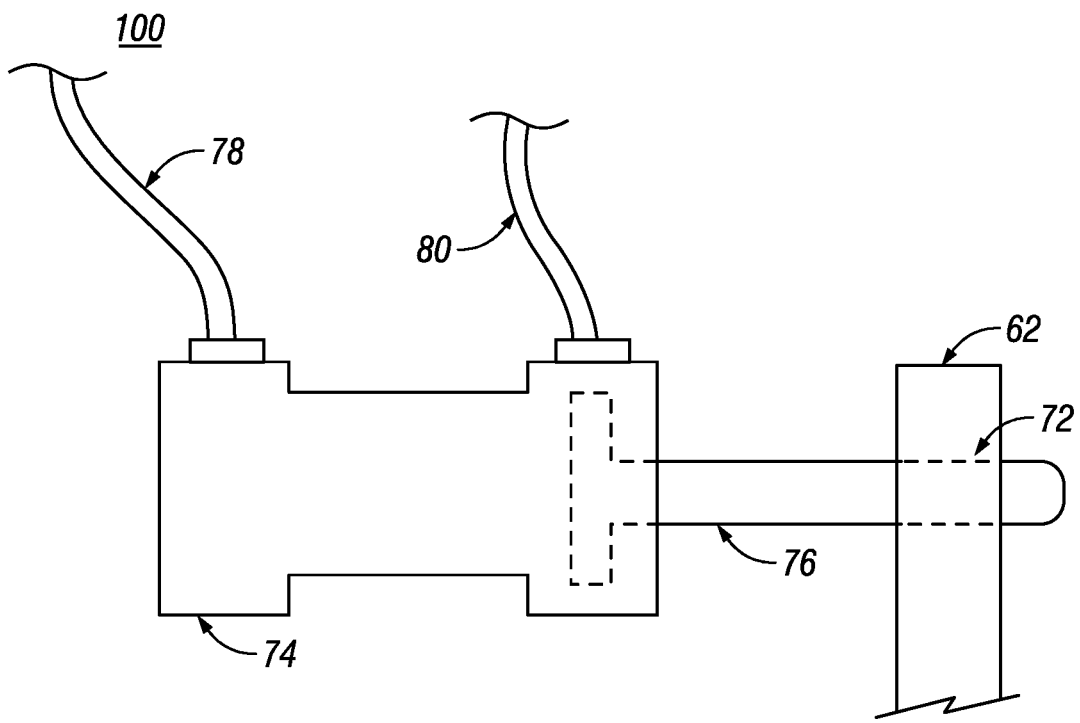
FIG. 5B is a block diagram illustrating a discharge door locking system in the locked position, according to a particular embodiment.

Hopper car 20 may include a discharge door locking system. For example, to prevent accidental opening of discharge door 64, such as during transit, a discharge door locking system may fasten operating beam 62 to a portion of the underframe. For example, a discharge door locking system may be mounted to center sill 34, and may lock operating beam 62 to prevent operating beam 62 from moving. An example discharge door locking system is illustrated in FIGS. 5A and 5B FIG. 5A is a block diagram illustrating a discharge door locking system in the unlocked position, according to a particular embodiment. Discharge door locking system 100 includes a lock cylinder, a lock piston, an extending input, and a retracting input. The lock cylinder may comprise lock air cylinder 74. Lock air cylinder 74 houses lock piston 76. Lock air cylinder 74 is operable to extend (see FIG. 5B) and retract (FIG. 5A) lock piston 76.

Operating beam 62, such as operating beam 62 described with respect to FIG. 4, comprises lock piston receiving recess 72. Lock piston receiving recess 72 is configured to receive lock piston 76 when lock piston 76 is in the extended position. In some embodiments, lock piston receiving recess 72 may comprise a recess extending partially into operating beam 62 or completely through operating beam 62 (i.e., a hole in operating beam 62).

In particular embodiments, the extending input includes lock extending air line 78 and the retracting input includes lock retracting air line 80. When compressed air is applied to lock extending air line 78, lock piston 76 extends into lock piston receiving recess 72, preventing operating beam 62 from moving. When compressed air is applied to lock retracting air line 80, lock piston 76 retracts out of lock piston receiving recess 72, permitting movement of operating beam 62.

FIG. 5B is a block diagram illustrating a discharge door locking system in the locked position, according to a particular embodiment. In FIG. 5B, compressed air has been supplied to lock extending air line 78. Lock piston 76 extends into lock piston receiving recess 72 and completely through operating beam 62. Operating beam 62, and thus discharge doors 64, are locked in the closed position.

FIGS. 5A and 5B illustrate a pneumatic discharge door locking system. Other embodiments may include electrical, hydraulic, or mechanical discharge door locking systems (e.g., the extending input and the retracting input may comprise electrical, hydraulic, and/or manual inputs). Some embodiments may include manual operation via a lever or cable. Some embodiments may include a combination. For example, some embodiments may pneumatically unlock the discharge door locking system, while using a spring or gravity to lock the discharge door locking system (see FIGS. 6-11). FIGS. 6-11 illustrate discharge door locking systems synchronized with the operating cylinder of the discharge door.

Figure 6A:
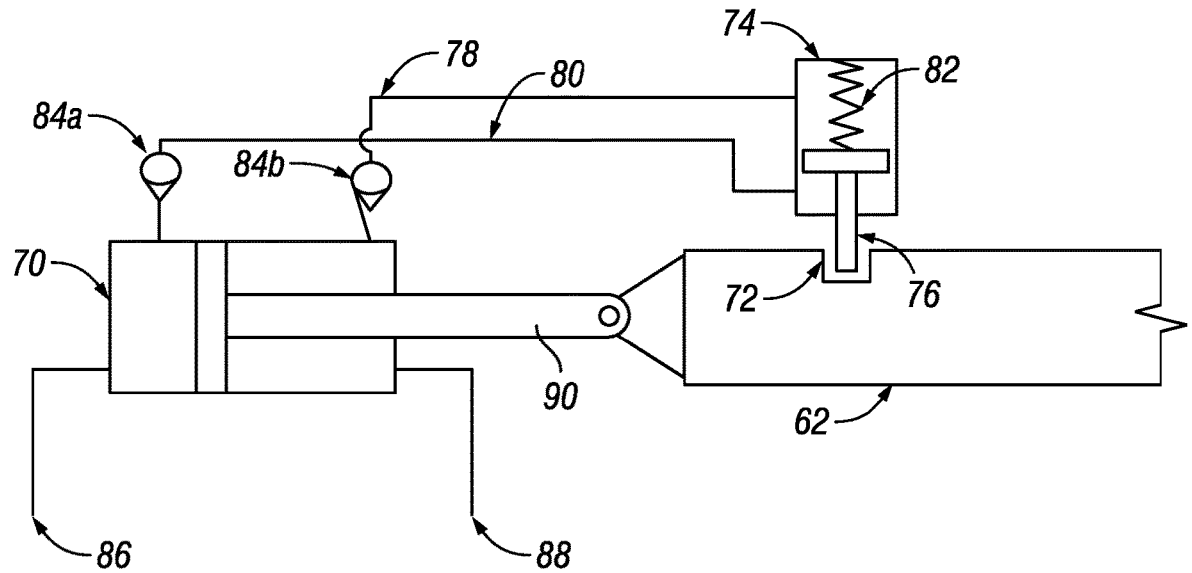
FIGS. 6A-6C are block diagrams illustrating a discharge door locking system coupled to the operating cylinder with ball valves, according to particular embodiments.

FIG. 6A is a block diagram illustrating a discharge door locking system coupled to the operating cylinder with ball valves, according to a particular embodiment. Operating cylinder 70 is coupled to operating beam 62 via operating piston 90. Operating cylinder 70 includes extending air line 86 (coupled to operating cylinder 70 behind operating piston 90) and retracting air line 88 (coupled to operating cylinder 70 in front of operating piston 90).

When compressed air is applied to extending air line 86, operating beam 62 moves in a first direction opening discharge doors 64. When compressed air is applied to retracting air line 88, operating beam 62 moves in a second, opposite direction closing discharge doors 64. Although a particular direction is illustrated, other embodiments may open or close discharge doors 64 by moving operating beam 62 in the opposite direction (e.g., push to open, pull to close; or pull to open, push to close).

In particular embodiments, discharge door locking system 100 may be synchronized with the operation of operating cylinder 70. For example, lock air cylinder 74 may be coupled to operating cylinder 70. As a particular example, lock retracting air line 80 may be coupled to operating cylinder 70 (behind operating piston 90) via check valve 84a. Lock extending air line 78 may be coupled to operating cylinder 70 (in front of operating piston 90) via check valve 84b. Check valves 84a and 84b may comprise a pneumatic ball check valve, or any other suitable valve.

When compressed air is applied to extending air line 86, compressed air also flows through check valve 84a to lock retracting air line 80, which retracts lock piston 76 and permits operating beam 62 to move in a first direction opening discharge doors 64. When compressed air is applied to retracting air line 88, compressed air also flows through check valve 84b to lock extending air line 78, which extends lock piston 76 into lock piston receiving recess 72 and prevents operating beam 62 from moving. Thus, operation of the discharge door locking system and the operating beam are synchronized.

In some embodiments, lock air cylinder may include spring 82. In some embodiments, spring 82 may comprise a safety backup feature. For example, if air pressure is lost, spring 82 may keep lock piston 76 engaged with lock piston receiving recess 72.

Figure 6B:
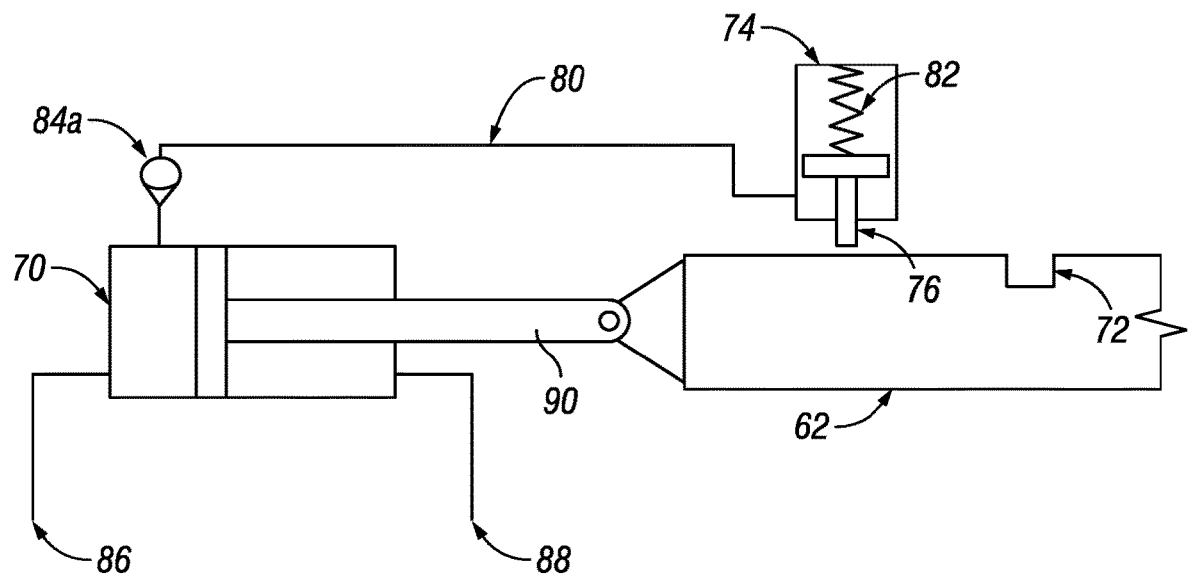

Other embodiments may include a hybrid pneumatic/mechanical system. For example, some embodiments may omit lock extending air line 78 (e.g., as illustrated in FIG. 6B). Lock piston 76 may be retracted pneumatically, and may be extended mechanically via spring, or any other suitable mechanism (mechanical, electrical, hydraulic, or otherwise).

FIG. 6B is another block diagram illustrating a discharge door locking system coupled to the operating cylinder with ball valves, according to a particular embodiment. The illustrated example is similar to FIG. 6A, but omits lock extending air line 78. In operation, when compressed air is applied to extending air line 86, compressed air also flows through check valve 84a to lock retracting air line 80, which retracts lock piston 76 and permits operating beam 62 to move in a first direction opening discharge doors 64. While operating beam 62 is in the open position, lock piston 76 may rest on operating beam 62. When compressed air is applied to retracting air line 88, operating beam 62 moves in a second, opposite direction closing discharge doors 64. Lock piston 76 may slide across operating beam 62 until lock piston 76 reaches lock piston receiving recess 72. Lock piston 76 may engage with piston receiving recess 72 via gravity or may be assisted by spring 82 in some embodiments.

Figure 6C:
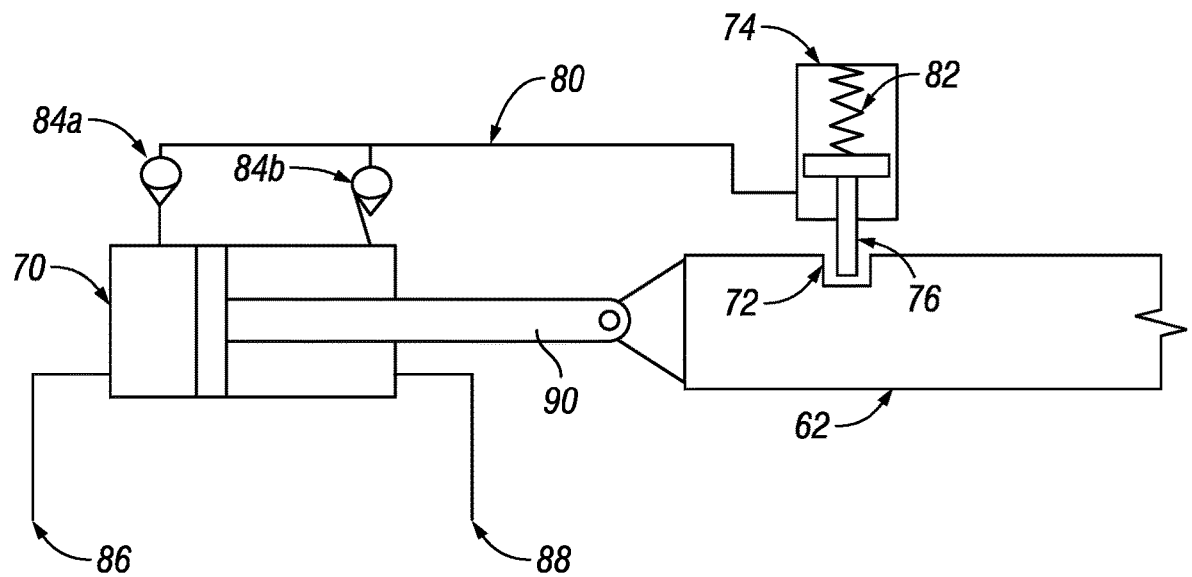

FIG. 6C is another block diagram illustrating a discharge door locking system coupled to the operating cylinder with ball valves, according to a particular embodiment. The illustrated example is similar to FIG. 6A, but omits lock extending air line 78 and instead both check valves 84a and 84b are both coupled to lock retracting air line 80. In operation, when compressed air is applied to extending air line 86, compressed air also flows through check valve 84a to lock retracting air line 80, which retracts lock piston 76 and permits operating beam 62 to move in a first direction opening discharge doors 64. While operating beam 62 is in the open position, lock piston 76 may rest on operating beam 62. When compressed air is applied to retracting air line 88, compressed air also flows through check valve 84a to lock retracting air line 80, which retracts lock piston 76 and operating beam 62 moves in a second, opposite direction closing discharge doors 64. In the illustrated example, lock piston 76 is not in contact with operating beam 62 until lock piston 76 reaches lock piston receiving recess 72. Lock piston 76 may engage with piston receiving recess 72 via gravity or may be assisted by spring 82 in some embodiments.

Particular embodiments may synchronize discharge door locking system 100 with the operation of operating beam 62 in any suitable manner. FIGS. 7 and 8 include additional examples.

Figure 7A:
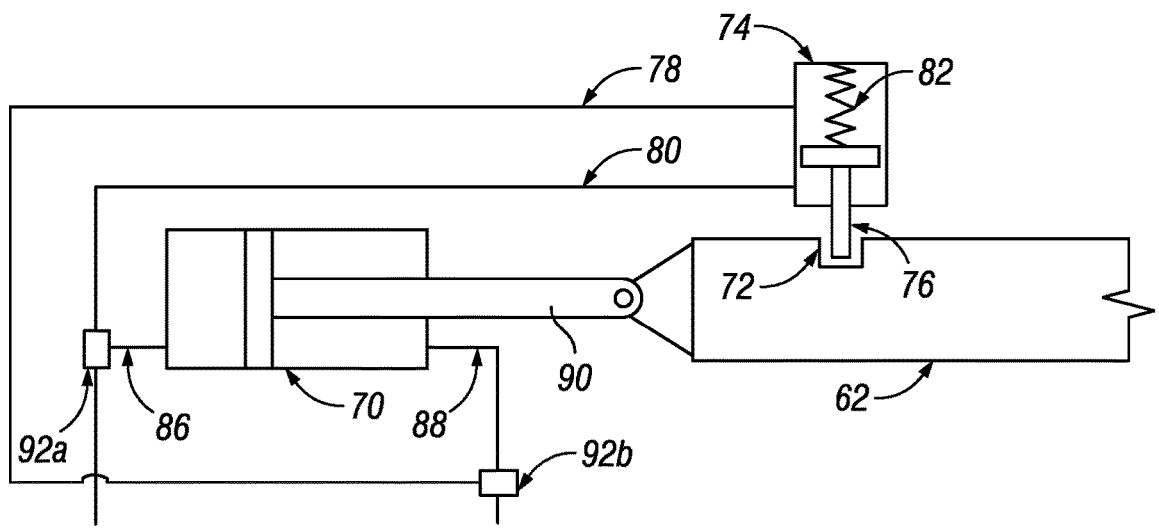
FIGS. 7A-7C are block diagrams illustrating a discharge door locking system coupled to the operating cylinder with a three way valve, according to particular embodiments.
Figure 8:
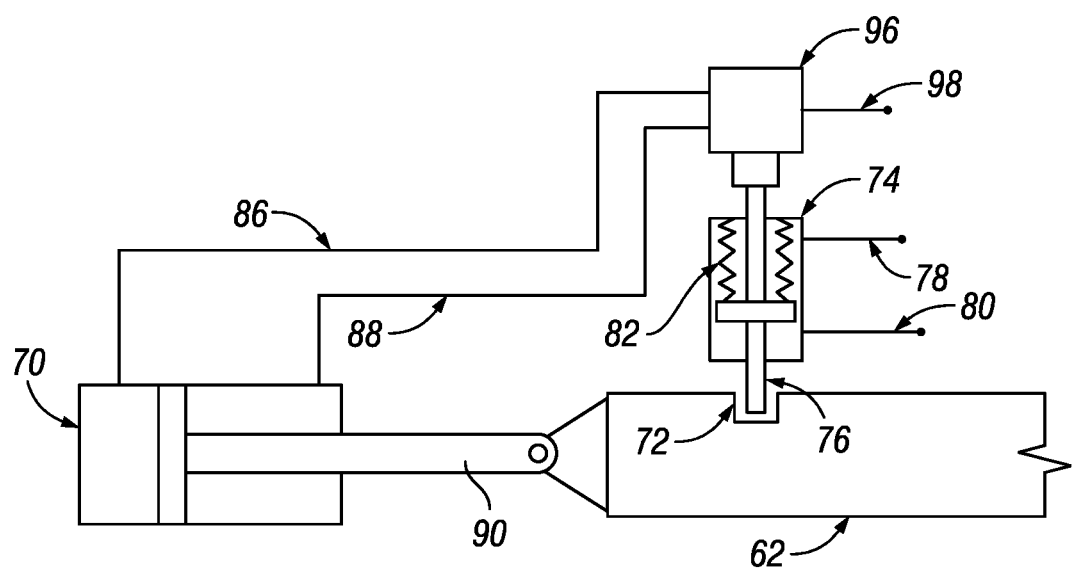
FIG. 8 is a block diagram illustrating a discharge door locking system coupled to the operating cylinder with a valve coupled to the lock piston, according to a particular embodiment.

FIG. 7A is a block diagram illustrating a discharge door locking system coupled to the operating cylinder with a three way valve, according to a particular embodiment. Discharge door locking system 100 may be synchronized with the operation of operating cylinder 70 similar to the embodiment described with respect to FIG. 6A, except that compressed air may be applied to both operating cylinder 70 and lock air cylinder 74 via 3-way valves 92a and 92b.

In particular embodiments, 3-way valve 92a may direct compressed air to lock retracting air line 80 and extending air line 86. 3-way valve 92b may direct compressed air to lock extending air line 78 and retracting air line 88. Thus, operating cylinder 70 and lock air cylinder 74 may be operated at the same time.

Figure 7B:
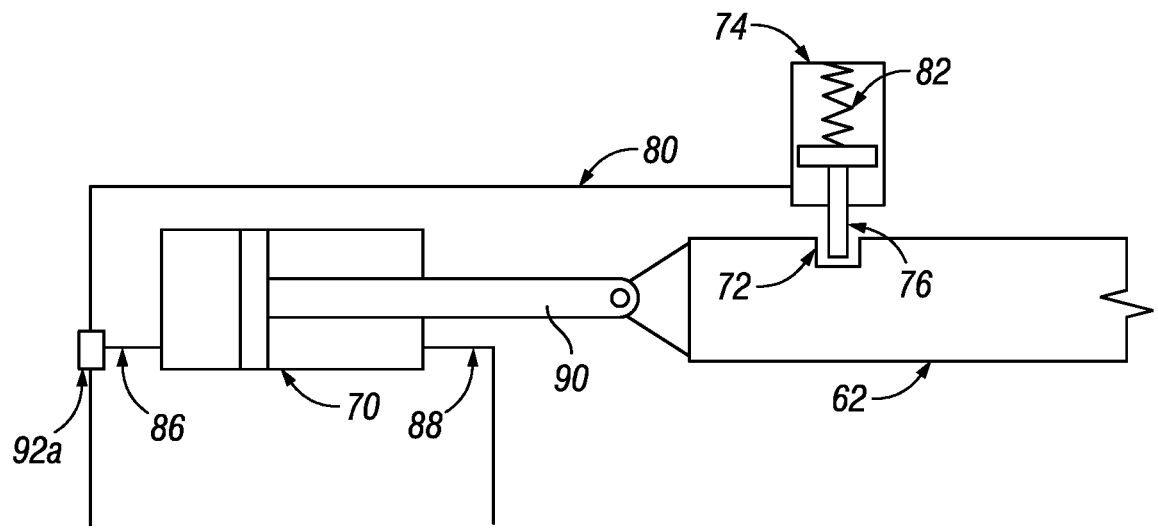

FIG. 7B is another block diagram illustrating a discharge door locking system coupled to the operating cylinder with a three way valve, according to a particular embodiment. The illustrated example is similar to FIG. 6B, but omits lock extending air line 78 and 3-way valve 92b. In operation, 3-way valve 92a may direct compressed air to lock retracting air line 80 and extending air line 86. Thus, operating cylinder 70 and lock air cylinder 74 may be operated at the same time. While operating beam 62 is in the open position, lock piston 76 may rest on operating beam 62. When compressed air is applied to retracting air line 88, operating beam 62 moves in a second, opposite direction closing discharge doors 64. Lock piston 76 may slide across operating beam 62 until lock piston 76 reaches lock piston receiving recess 72. Lock piston 76 may engage with piston receiving recess 72 via gravity or may be assisted by spring 82 in some embodiments.

Figure 7C:
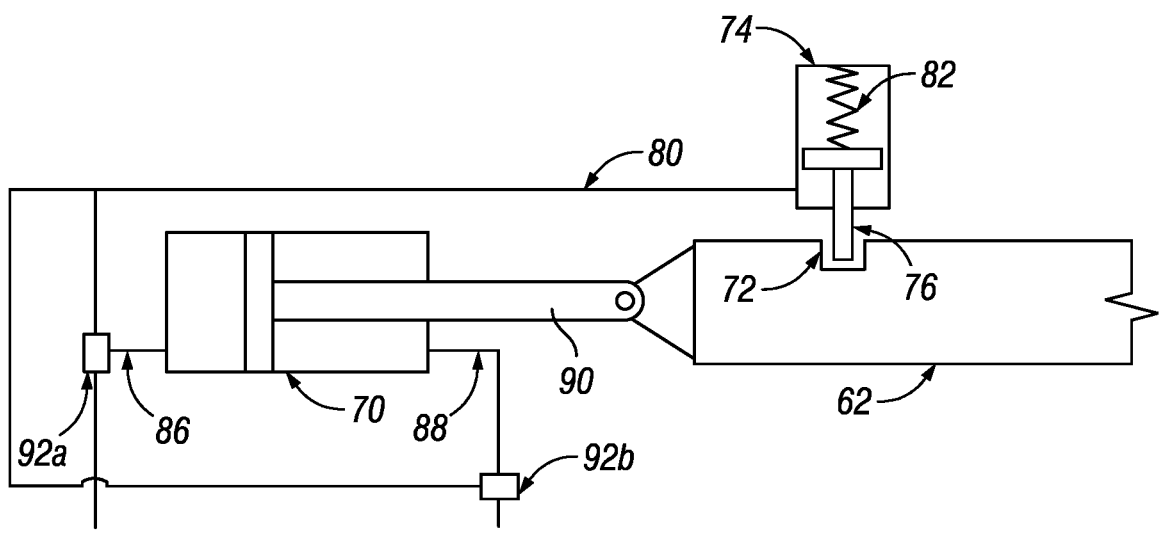

FIG. 7C is another block diagram illustrating a discharge door locking system coupled to the operating cylinder with a three way valve, according to a particular embodiment. The illustrated example is similar to FIG. 6C, but omits lock extending air line 78 and 3-way valves 92a and 92b are both coupled to lock retracting air line 80. In operation, 3-way valve 92a may direct compressed air to lock retracting air line 80 and extending air line 86. Thus, operating cylinder 70 and lock air cylinder 74 may be operated at the same time. While operating beam 62 is in the open position, lock piston 76 may rest on operating beam 62.

FIG. 6C is another block diagram illustrating a discharge door locking system coupled to the operating cylinder with ball valves, according to a particular embodiment. The illustrated example is similar to FIG. 6A, but omits lock extending air line 78 and instead both check valves 84a and 84b are both coupled to lock retracting air line 80. In operation, when compressed air is applied to extending air line 86, compressed air also flows through check valve 84a to lock retracting air line 80, which retracts lock piston 76 and permits operating beam 62 to move in a first direction opening discharge doors 64. While operating beam 62 is in the open position, lock piston 76 may rest on operating beam 62. 3-way valve 92b may direct compressed air to lock retracting air line 80 and retracting air line 88, which retracts lock piston 76 and operating beam 62 moves in a second, opposite direction closing discharge doors 64. In the illustrated example, lock piston 76 is not in contact with operating beam 62 until lock piston 76 reaches lock piston receiving recess 72. Lock piston 76 may engage with piston receiving recess 72 via gravity or may be assisted by spring 82 in some embodiments.

FIG. 8 is a block diagram illustrating a discharge door locking system coupled to the operating cylinder with a valve coupled to the lock piston. Similar to FIGS. 4-7, operating cylinder 70 facilitates movement of operating beam 62. Operating cylinder 70 is coupled to operating beam 62 via operating piston 90. Operating cylinder 70 includes extending air line 86 and retracting air line 88. When compressed air is applied to extending air line 86, operating beam 62 moves in a first direction opening discharge doors 64. When compressed air is applied to retracting air line 88, operating beam 62 moves in a second, opposite direction closing discharge doors 64.

Lock air cylinder 74 facilitates movement of lock piston 76. For example, lock extending air line 78 supplies compressed air to lock air cylinder 74 to extend lock piston 76. Lock retracting air line 80 supplies compressed air to lock air cylinder 74 to retract lock piston 76.

In particular embodiments, discharge door locking system 100 may be synchronized with the operation of operating cylinder 70. For example, lock air cylinder 74 may be coupled to operating cylinder actuating valve 96. Operating cylinder actuating valve 96 controls operating cylinder 70 by supplying compressed air to either the extending or retracting inputs of operating cylinder 70.

Operating cylinder actuating valve 96 includes operating cylinder air line 98. Operating cylinder air line 98 provides compressed air for operating cylinder 70. For example, in a first position operating cylinder actuating valve 96 supplies compressed air from operating cylinder air line 98 to extending air line 86. In a second position, operating cylinder actuating valve 96 supplies compressed air from operating cylinder air line 98 to retracting air line 88. Thus, operating cylinder actuating valve 96 controls operating cylinder 70 by switching compressed air from operating cylinder air line 98 to either extending air line 86 or retracting air line 88.

Operating cylinder actuating valve 96 may be controlled by lock piston 76. For example, lock piston 76 may be coupled to operating cylinder actuating valve 96. Movement of lock piston 76 from the retracted to extended position, and vice versa, may switch operating cylinder actuating valve 96 from a first position to a second position.

For example, when compressed air is supplied to lock retracting air line 80, compressed air flows through retracting air line 80 and retracts lock piston 76. Lock piston 76 may switch operating cylinder actuating valve 96 to a first position so that operating cylinder actuating valve 96 supplies compressed air from operating cylinder air line 98 to extending air line 86 which extends operating beam 62 in a first direction to open discharge doors 64. When compressed air is supplied to lock extending air line 78, compressed air flows through extending air line 78 and extends lock piston 76. Lock piston 76 may switch operating cylinder actuating valve 96 to a first position so that operating cylinder actuating valve 96 supplies compressed air from operating cylinder air line 98 to extending air line 86 which retracts operating beam 62 in a second direction to close discharge doors 64.

As operating beam 62 closes discharge doors 64, lock piston 76 engages into lock piston receiving recess 72, which prevents operating beam 62 from moving. Thus, operation of the discharge door locking system and the operating beam are synchronized.

In some embodiments, lock air cylinder may include spring 82. In some embodiments, spring 82 may comprise a safety backup feature. For example, if air pressure is lost, spring 82 may keep lock piston 76 engaged with lock piston receiving recess 72.

A particular advantage of the illustrated embodiment is that if the lock mechanism is not disengaged (i.e., lock piston 76 is not retracted) the operating cylinder will not receive air pressure (e.g., lock piston 76 will not actuate operating cylinder actuating valve 96). Thus, the operating cylinder is not able to move the operating beam while the operating beam is locked. This prevents excessive loading and wear on components.

Other embodiments may include a hybrid pneumatic/mechanical system. For example, some embodiments may omit lock extending air line 78. Lock piston 76 may be retracted pneumatically, and may be extended mechanically via spring, or any other suitable mechanism (mechanical, electrical, hydraulic, or otherwise).

Some embodiments may include a pneumatic discharge door locking system in conjunction with a mechanical operating beam lock. An example is illustrated in FIG. 9.

Figure 9:
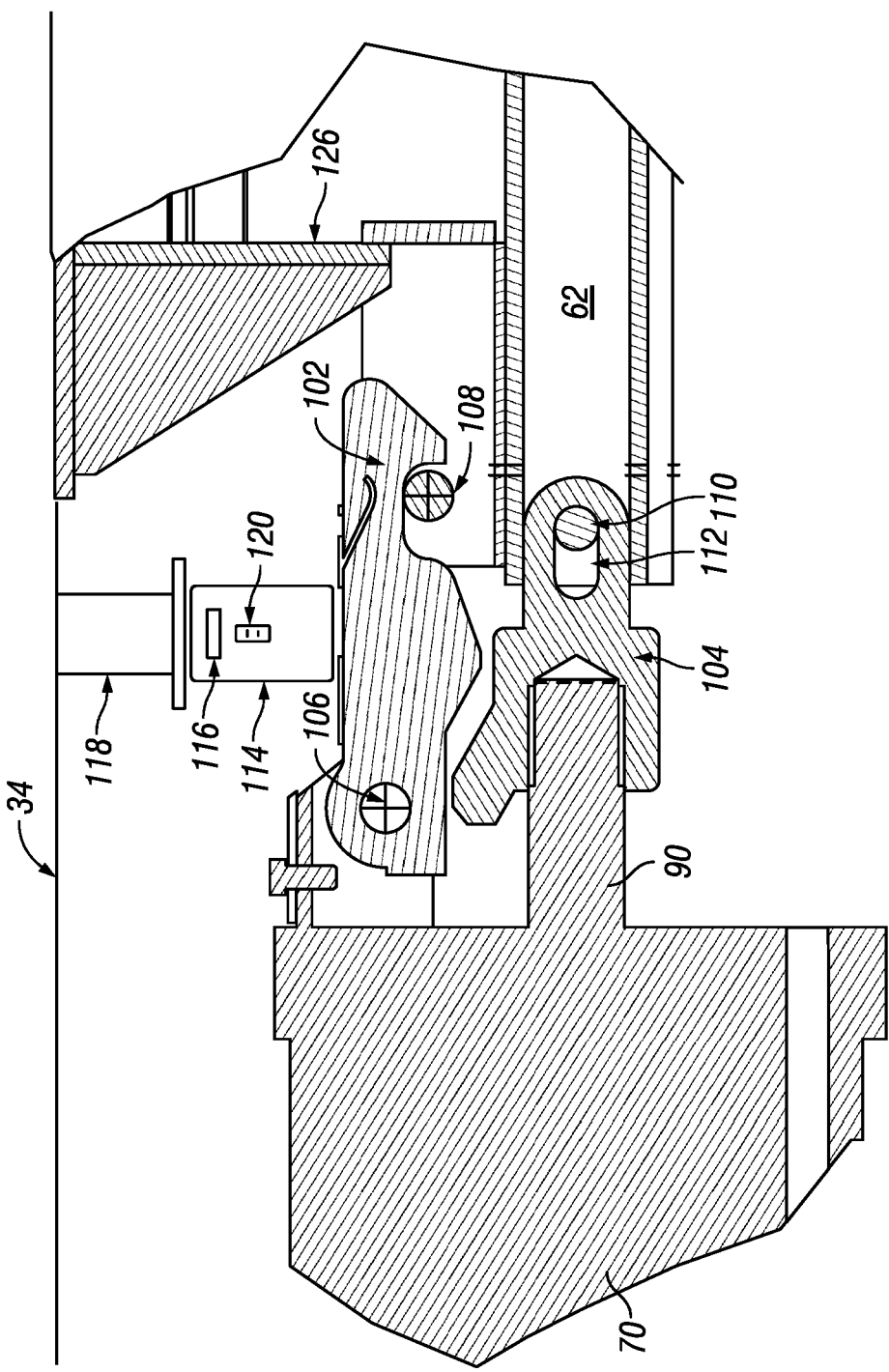
FIG. 9 is a section view of a discharge door locking system for a mechanical lock, according to a particular embodiment.

FIG. 9 is a section view of a discharge door locking system for a mechanical lock, according to a particular embodiment. The section view is along the longitudinal centerline of the operating beam. Similar to FIGS. 4-8, operating cylinder 70 is coupled to operating beam 62 via operating piston 90. Operating cylinder 70 moves operating beam 62 in a first direction to open discharge doors 64, and moves operating beam 62 in a second, opposite direction to close discharge doors 64. In the illustrated embodiment, operating beam 62 moves right and left.

The example embodiment includes a mechanical operating beam lock. The mechanical operating beam lock includes locking latch 102, lock cam 104, locking latch pivot 106, and locking rod 108. Locking latch 102 pivots up and down on locking latch pivot 106. Locking rod 108 is coupled to operating beam 62. In the down position, locking latch 102 partially surrounds locking rod 108, preventing operating beam 62 from moving. In the up position, locking latch 102 does not contact locking rod 108, and operating beam 62 is free to move back and forth.

Operating piston 90 is coupled to operating beam 62 via lock cam 104. Lock cam 104 comprises a protrusion that lifts locking latch 102 as lock cam 104 moves to the right in the figure and lowers locking latch 102 as lock cam 104 moves to the left in the figure. For example, as operating cylinder 70 extends operating piston 90 to open discharge doors 64, lock cam 104 moves to the right, which causes the protrusion of lock cam 104 to lift locking latch 102 and unlocks operating beam 62. As operating cylinder 70 retracts operating piston 90 to close discharge doors 64, lock cam 104 moves to the left, which lowers locking latch 102 onto lock rod 108 and locks operating beam 62.

Lock cam 104 is coupled to operating beam 62 via lock cam pin 110 and elongated hole 112. Lock cam 104 includes elongated hole 112. Lock cam pin 110 is coupled to operating beam 62 through elongated hole 112. The width of elongated hole 112 is wider than lock cam pin 110. Lock cam pin 110 may move the width of elongated hole 112 before operating beam 62 moves. Thus, elongated hole 112 enables lock cam 104 to unlock locking latch 102 before operating beam 62 begins to move, and enables lock cam 103 to lock locking latch 102 after operating beam 62 has stopped moving.

For example, as operating cylinder 70 extends operating piston 90, lock cam 104 moves to the right for the width of elongated hole 112 before lock cam pin 110 contacts the other side of elongated hole 112 and causes operating beam 62 to move. The initial movement of lock cam 104 is enough for the protrusion of lock cam 104 to unlock locking latch 102 before operating beam 62 begins to move. Similarly, elongated hole 112 and stop bracket 126 enable lock cam 103 to lock locking latch 102 after operating beam 62 has stopped moving.

Stop bracket 126 is a mechanical stop that prevents operating beam 62 from moving any further in the direction towards operating cylinder 70. Stop bracket 126 is coupled to center sill 34. Stop bracket 126 may comprise a steel bracket welded to center sill 34.

As operating cylinder 70 retracts operating piston 90, operating beam 62 contacts stop bracket 126 which causes operating beam 62 to stop moving. After operating beam 62 stops moving, lock cam 104 continues moving to the left for the width of elongated hole 112. The additional movement of lock cam pin 110 lets locking latch 102 drop onto locking rod 108 after operating beam 62 has stopped moving. Locking latch 102 may drop onto locking rod 108 via gravity or with the assistance of springs.

A particular advantage of some embodiments is to prevent accidental unlocking by using a lock block that physically prevents the mechanical operating beam lock from unlocking. Lock block 114 is coupled to center sill 34 via bracket 118. When hopper car 20 is in motion, lock block 114 is positioned above locking latch 102, preventing locking latch 102 from lifting up. Lock block 114 may comprise steel, rubber, plastic, or any other suitable material.

Lock block 114 is also slidably coupled to track 116. Lock block 114 may slide from a first position over locking latch 102, and obstructing upward movement of locking latch 102, to a second position that does not obstruct the movement of locking latch 102. When lock block 114 is in the second position, locking latch 102 may be lifted up to unlock operating beam 62.

Lock block 114 includes cylinder mount 20. Cylinder mount 20 couples lock block 114 to a lock operating cylinder, such as lock operating cylinder 122 illustrated in FIGS. 10 and 11.

Figure 10:
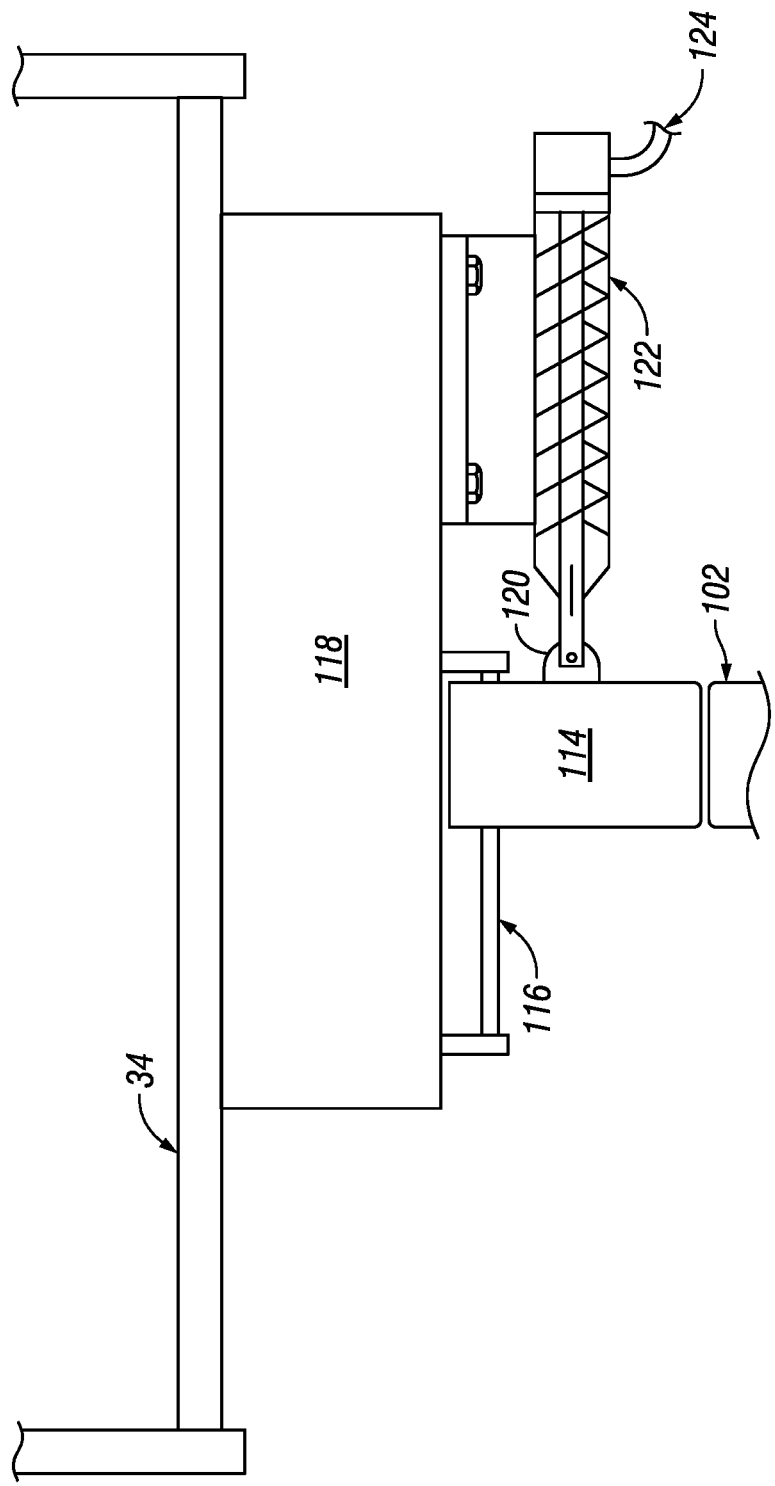
FIG. 10 is a section view of a discharge door locking system for a mechanical lock in the locked position, according to a particular embodiment.

FIG. 10 is a section view of a discharge door locking system for a mechanical lock in the locked position, according to a particular embodiment. The section view is along a transverse line through hopper car 20 illustrating lock block 114 as described with respect to FIG. 9.

Figure 11:
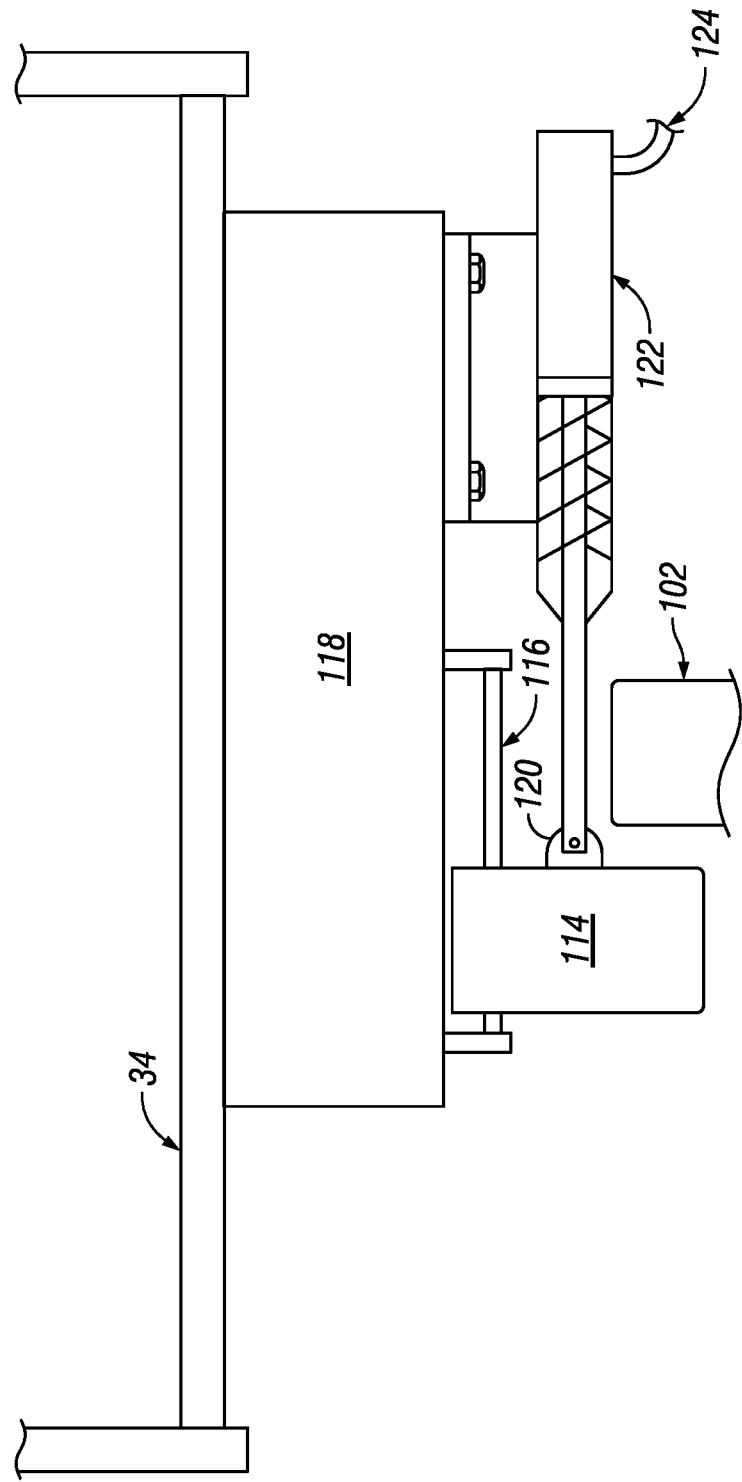
FIG. 11 is a section view of a discharge door locking system for a mechanical lock in the unlocked position, according to a particular embodiment.

Lock operating cylinder 122 is coupled to lock block 114 via cylinder mount 20. Lock operating cylinder 122 is operable to move lock block 114 along track 116. When hopper car 20 is in motion, lock operating cylinder 122 retracts and lock block 114 is in the first position (as illustrated) preventing locking latch 102 from moving. FIG. 11 illustrates lock block 114 in the second, unlocked position.

FIG. 11 is a section view of a discharge door locking system for a mechanical lock in the unlocked position, according to a particular embodiment. The section view is the same as FIG. 10.

When hopper car 20 is stopped, operating cylinder 122 extends which moves lock block 114 to the second position (as illustrated), enabling locking latch 102 to be lifted up to the unlocked position.

In particular embodiments, the discharge door locking system may be synchronized with the operation of operating cylinder 70. For example, lock operating cylinder 122 may include air inlet 124. When lock operating cylinder 122 receives compressed air via air inlet 124, the compressed air causes lock operating cylinder 122 to extend and move lock block 114 to the second position. When lock block 114 is in the second position, operating cylinder 70 may be activated to open or close discharge doors 64. Lock operating cylinder 122 also includes one or more springs that return lock operating cylinder 122 to the retracted position when compressed air is removed from air inlet 124.

In particular embodiments, air inlet 124 receives compressed air whenever hopper car 20 is connected to a compressed air source. For example, when hopper car 20 is in a rail yard and a rail operator connects hopper car 20 to a compressed air source, lock operating cylinder 122 is automatically extended to move lock block 114 to the second position. Then, the rail operator may activate or deactivate operating cylinder 70 using the separate pneumatic controls for operating cylinder 70. When the rail operator disconnects hopper car 20 from a compressed air source, lock operating cylinder automatically retracts to move lock block 114 to the first position. Thus, when rail car 20 is connected to a compressed air source, an operator is free to open and close discharge doors 64. When rail car 20 is disconnected from the compressed air source (e.g., in transit) discharge doors 64 are locked.

Figure 12:
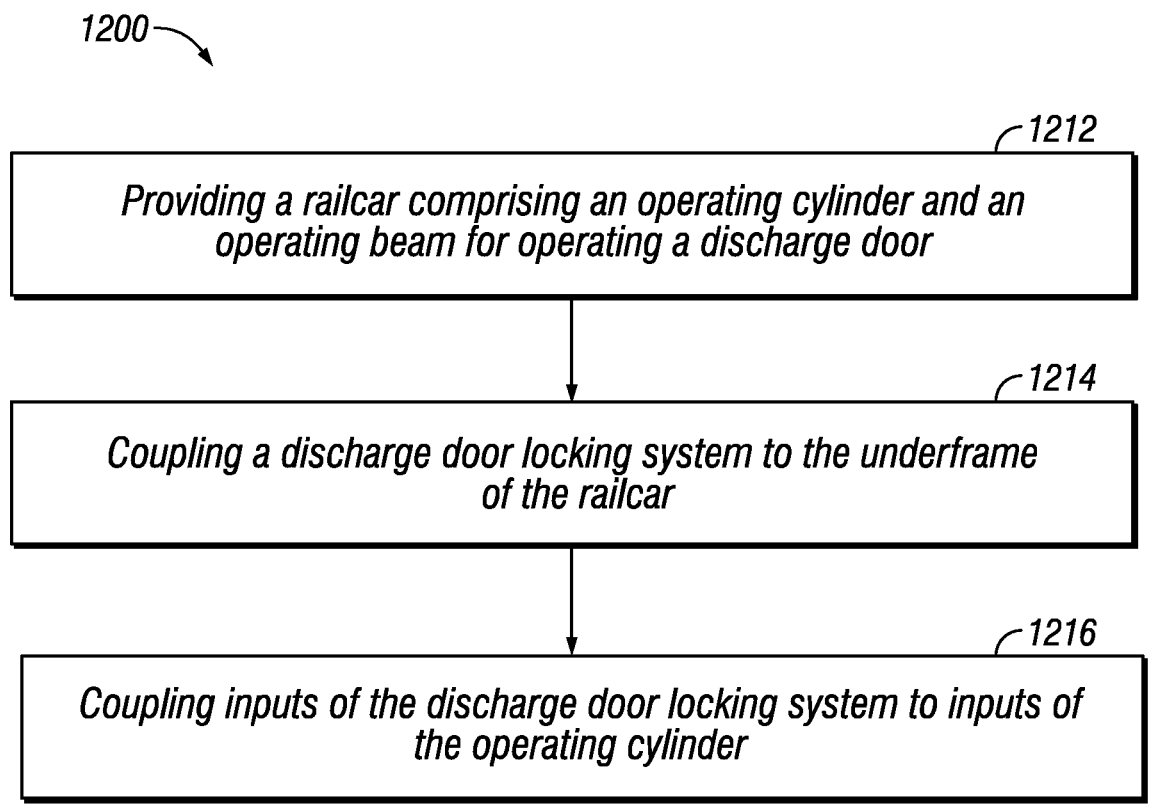
FIG. 12 is a flow diagram illustrating an example method of outfitting a railcar with a discharge door locking system, according to some embodiments.

FIG. 12 is a flow diagram illustrating an example method of outfitting a railcar with a discharge door locking system, according to some embodiments. In particular embodiments, one or more steps of FIG. 12 may be performed to outfit hopper car 20 with discharge door locking system 100, described with respect to FIGS. 1-11.

The method begins at step 1212, where a railcar is provided. The railcar comprises an underframe, a hopper coupled to the underframe, a discharge door coupled to the hopper proximate the underframe, and an operating beam coupled to the discharge door and the underframe.

In some embodiments, the operating beam comprises a lock piston receiving recess. The railcar further comprises an operating cylinder coupled to the operating beam. The operating cylinder comprises a first input and a second input. The operating cylinder is configured to move the operating beam between a first position where the discharge door is in a closed position and a second position where the discharge door is in an open position. Activation of the first input causes the operating cylinder to move the operating beam to the first position, and activation of the second input causes the operating cylinder to move the operating beam to the second position.

In some embodiments, the operating cylinder is coupled to the operating beam with a mechanical operating beam lock. In these embodiments, the operating beam may not include a lock piston receiving recess.

For example, step 1212 may comprise providing hopper car 20 as described with respect to any of FIGS. 1-11. In particular embodiments, the railcar may be a new railcar under construction, or the railcar may be an existing railcar to be retrofitted with a discharge door locking system.

At step 1214, a discharge door locking system is coupled to the underframe of the railcar. In some embodiments, the discharge door locking system comprises a lock piston, a first input, and a second input. The discharge door locking system may be configured to move the lock piston between a first position where the lock piston is not engaged with the lock piston receiving recess and a second position where the lock piston is engaged with the lock piston receiving recess. Activation of the first input moves the lock piston to the first position, and activation of the second input moves the lock piston to the second position.

For example, discharge door locking system 100 may be coupled to an underframe of hopper car 20. Discharge door locking system 100 may be coupled to center sill 34, or any other suitable mounting location on hopper car 20. Discharge door locking system 100 may be positioned so that lock piston 76 may engage with lock piston receiving recess 72 of operating beam 62 when lock piston 76 is in the extended position.

In some embodiments, the discharge door locking system may comprise a lock block slidably coupled to the underframe. The lock block may be configured to move between a first position where the lock block prevents the mechanical operating beam lock from moving to the unlocked position and a second position where the lock block does not prevent the mechanical operating beam lock from moving to the unlocked position. For example, discharge door locking system 100 may comprise lock block 114 slidably coupled to center sill 34 via bracket 118 and track 116.

At step 1216, the inputs of the discharge door locking system are coupled to the inputs of the operating cylinder. In particular embodiments, the second input of the operating cylinder may be coupled to the first input of the discharge door locking system. The first input of the operating cylinder may be coupled to the second input of the discharge door locking system. When the second input of the operating cylinder is activated to move the discharge door to the open position, the first input of the discharge door locking system is also activated to disengage the lock piston from the lock piston receiving recess. When the first input of the operating cylinder is activated to move the discharge door to the closed position, the second input of the discharge door locking system is also activated to engage the lock piston with the lock piston receiving recess.

In particular embodiments, the discharge door locking system includes an operating cylinder actuating valve coupled to the lock piston, the first input of the operating cylinder, and the second input of the operating cylinder. Coupling the inputs of the discharge door locking system to the inputs of the operating cylinder may include coupling the first and second input of the operating cylinder to the operating cylinder actuating valve. When the lock piston is in the first position, the operating cylinder actuating valve is configured to activate the second input of the operating cylinder to move the discharge door to the open position. When the lock piston is in the second position, the operating cylinder actuating valve is configured to activate the first input of the operating cylinder to move the discharge door to the closed position.

In some embodiments, the discharge door locking system includes a lock block and a lock operating cylinder with an air inlet. The air inlet of the lock operating cylinder and the first and second inputs of the operating cylinder may be coupled to a compressed air source. When the air inlet of the lock operating cylinder is coupled to the compressed air source, the lock block automatically slides to an unlocked position. The first and second inputs of the operating cylinder may be used to open or close the discharge doors. When the air inlet of the lock operating cylinder is decoupled from the compressed air source, the lock block automatically slides to a locked position.

For example, discharge door locking system 100 may be synchronized with the operation of operating cylinder 70 by coupling lock air cylinder 74 to operating cylinder 70. Lock air cylinder 74 may be coupled to operating cylinder 70 according to any of the examples described with respect to FIGS. 5A-11.

In a retrofit application, for example, a 3-way valve may be added to the two air inputs to operating cylinder 70 to provide compressed air to the two inputs of lock air cylinder 74. In another example, outlet ports may be added to operating cylinder 70, which may be used in conjunction with ball valves to provide compressed air to the inputs of lock air cylinder 74.

In another retrofit example, the two air inputs of operating cylinder 70 may be coupled to an operating cylinder actuating valve. The operating cylinder actuating valve may also be coupled to lock air cylinder 74 such that the position of lock piston 76 controls the operating cylinder actuating valve.

In another retrofit example, lock block 114 may be slidably coupled to the center sill directly above a mechanical operating beam lock. Lock block 114 prevents the mechanical operating beam lock when hopper car 20 is in transit, and automatically slides out of the way of the mechanical operating beam lock when compressed air is applied to hopper car 20.

Modifications, additions, or omissions may be made to method 1200. Additionally, one or more steps in method 1200 of FIG. 12 may be performed in parallel or in any suitable order.

Although the components in FIGS. 1-12 are described with respect to longitudinal doors, particular embodiments may include transverse doors, or any other suitable discharge door of a railcar.

Although particular embodiments and their advantages have been described in detail, it should be understood that various changes, substitutions and alternations can be made herein without departing from the spirit and scope of the embodiments.

The invention claimed is:

1. A railcar comprising:
an underframe;
a hopper coupled to the underframe;
a discharge door coupled to the hopper proximate the underframe;
an operating beam coupled to the discharge door and the underframe, the operating beam comprising a lock piston receiving recess;
an operating cylinder coupled to the operating beam, the operating cylinder comprising a first input and a second input, the operating cylinder configured to move the operating beam between a first position where the discharge door is in a closed position and a second position where the discharge door is in an open position, wherein activation of the first input causes the operating cylinder to move the operating beam to the first position and activation of the second input causes the operating cylinder to move the operating beam to the second position; and
a discharge door locking system coupled to the underframe, the discharge door locking system comprising a lock piston, a first input, and a second input, the discharge door locking system configured to move the lock piston between a first position where the lock piston is not engaged with the lock piston receiving recess and a second position where the lock piston is engaged with the lock piston receiving recess, wherein activation of the first input of the discharge door locking system moves the lock piston to the first position and activation of the second input of the discharge door locking system moves the lock piston to the second position;
wherein the second input of the operating cylinder is coupled to the first input of the discharge door locking system such that when the second input of the operating cylinder is activated to move the discharge door to the open position, the first input of the discharge door locking system is also activated to disengage the lock piston from the lock piston receiving recess.

2. The railcar of claim 1, wherein the first input and the second input of the operating cylinder and the first input of the discharge door locking system comprise pneumatic inputs.

3. The railcar of claim 2, wherein the second input of the operating cylinder is coupled to the first input of the discharge door locking system via a check valve.

4. The railcar of claim 2, wherein the second input of the operating cylinder is coupled to the first input of the discharge door locking system via a 3-way valve.

5. The railcar of claim 1, wherein the first input of the operating cylinder is coupled to the first input of the discharge door locking system, such that when the first input of the operating cylinder is activated to move the discharge door to the closed position, the first input of the discharge door locking system is also activated.

6. The railcar of claim 5, wherein the first input of the operating cylinder is coupled to the first input of the discharge door locking system via a check valve.

7. The railcar of claim 5, wherein the second input of the operating cylinder is coupled to the first input of the discharge door locking system via a 3-way valve.

8. The railcar of claim 1, wherein the second input of the discharge door locking system comprises a spring.

9. The railcar of claim 1, wherein the second input of the discharge door locking system comprises gravity.

10. A discharge door locking system for a railcar discharge door, the discharge door locking system comprising:

a lock piston configured to move between a first position where the lock piston is not engaged with a lock piston receiving recess of an operating beam coupled to a discharge door and a second position where the lock piston is engaged with the lock piston receiving recess;

a first input, wherein activation of the first input moves the lock piston to the first position; and a second input, wherein activation of the second input moves the lock piston to the second position; and wherein the first input of the discharge door locking system is coupled to a first input of an operating cylinder coupled to the operating beam, the first input of the operating cylinder configured to, when activated, move the discharge door to the open position.

11. The discharge door locking system of claim 10, wherein the first input of the discharge door locking system comprises a pneumatic input.

12. The discharge door locking system of claim 10, wherein the first input of the discharge door locking system is coupled to the first input of the operating cylinder via a check valve.

13. The discharge door locking system of claim 10, wherein the first input of the discharge door locking system is coupled to the first input of the operating cylinder via a 3-way valve.

14. The discharge door locking system of claim 10, wherein the second input of the operating cylinder is coupled to the second input of the discharge door locking system, such that when the second input of the operating cylinder is activated to move the discharge door to the closed position, the first input of the discharge door locking system is also activated.

15. The discharge door locking system of claim 10, wherein the second input of the discharge door locking system is coupled to the first input of the operating cylinder via a check valve.

16. The discharge door locking system of claim 10, wherein the second input of the discharge door locking system is coupled to the first input of the operating cylinder via a 3-way valve.

17. The discharge door locking system of claim 10, wherein the second input of the discharge door locking system comprises a spring.

18. The discharge door locking system of claim 10, wherein the second input of the discharge door locking system comprises gravity.

* * * * *